United States Patent [19]

Lin

[11] Patent Number: 5,731,076
[45] Date of Patent: Mar. 24, 1998

[54] RECORDING MEDIA

[75] Inventor: Chien-Jung Lin, San Jose, Calif.

[73] Assignee: International Business Machines Corporation, Armonk, N.Y.

[21] Appl. No.: 17,941

[22] Filed: Feb. 11, 1993

Related U.S. Application Data

[63] Continuation of Ser. No. 863,378, Apr. 3, 1992, abandoned, which is a continuation of Ser. No. 499,860, Mar. 26, 1990, abandoned.

[51] Int. Cl.$^6$ .................................. G11B 5/66; B32B 5/16
[52] U.S. Cl. .................. 428/332; 428/336; 428/694 ML; 428/694 NF; 428/694 MM; 428/694 IS; 369/13; 369/288
[58] Field of Search .......................... 428/336, 332, 428/694 ML, 694 NF, 694 MM, 694 IS, 900; 369/13, 288

[56] References Cited

U.S. PATENT DOCUMENTS

| | | | |
|---|---|---|---|
| 3,650,601 | 3/1972 | Bierlein | 365/122 |
| 4,025,379 | 5/1977 | Whetstone | 29/306 |
| 4,569,881 | 2/1986 | Freese et al. | 428/213 |
| 4,576,699 | 3/1986 | Sato et al. | 204/192.26 |
| 4,635,076 | 1/1987 | Wilson et al. | 346/135.1 |
| 4,666,789 | 5/1987 | Gueugnon | 428/611 |
| 4,668,573 | 5/1987 | Terao et al. | 428/336 |
| 4,727,005 | 2/1988 | Sato | 428/609 |
| 4,789,606 | 12/1988 | Yamada et al. | 428/694 SC |
| 4,801,499 | 1/1989 | Aoyama et al. | 428/336 |
| 4,833,043 | 5/1989 | Gardner | 428/694 ML |
| 4,837,118 | 6/1989 | Yamamoto et al. | 428/645 |
| 4,842,956 | 6/1989 | Kobayashi | 428/611 |
| 4,920,007 | 4/1990 | Sawamura et al. | 428/457 |
| 4,922,454 | 5/1990 | Taki | 365/122 |
| 4,939,023 | 7/1990 | Owata et al. | 428/215 |
| 4,977,019 | 12/1990 | Schaefer | 428/317.5 |

FOREIGN PATENT DOCUMENTS

| | | |
|---|---|---|
| 0314518 | 5/1989 | European Pat. Off. . |
| 8402419 | 6/1984 | United Kingdom ............ G11B 7/24 |

Primary Examiner—Leszek Kiliman
Attorney, Agent, or Firm—Noreen A. Krall; Douglas R. Millett

[57] ABSTRACT

A recording media comprises in cross-section, a substrate, a first dielectric layer, a recording section, a second dielectric layer and a reflector layer. The recording section comprises a plurality of thin magneto-optic recording layers interspersed with thin separating dielectric layers. The multiple magneto-optic layers act to average out the transition errors and results in improved signal to noise ratio performance.

12 Claims, 2 Drawing Sheets

RECORDING MEDIA

This is continuation of Ser. No. 07/863,378, Apr. 3, 1992, now abandoned, which is continuation of Ser. No. 07/499,860, Mar. 26, 1990, now abandoned

TECHNICAL DESCRIPTION

This invention relates generally to recording media and relates more particularly to optical recording media having a plurality of thin recording layers.

BACKGROUND OF THE INVENTION

Magneto-optic recording disks provide for erasable storage of data. The magneto-optic media typically comprises a transparent substrate, a first transparent dielectric layer, a magneto-optic recording layer, a second transparent dielectric layer and a reflector layer. A laser beam is focussed on to a spot on the media and heats up the magneto-optic material to a temperature at which the magnetic domain of the recording layer is changed. A magnetic field is switched in one of two directions to orient the magnetic domain of the spot in either an upward or downward direction.

The disk is read by focusing a low power laser beam on to the magneto-optic layer. The Kerr effect will cause the reflected beam's plane of polarization to be rotated either clockwise or counter-clockwise depending upon whether the spot has an upward or downward magnetic orientation. The difference in the rotation is detected and represents either a one or zero.

These prior art magneto-optic recording disks have resulted in carrier signal to noise ratios of approximately 63 to 64 dB (30 kHz bandwidth). The media writing noise, resulting from the irregularities in the magnetic domain transitions, is the primary limiting factor in achieving a high signal to noise ratio. What is needed is a recording media which will achieve a higher signal to noise ratio.

SUMMARY OF THE INVENTION

Toward this end and according to the invention, a magneto-optic recording media is comprised of a substrate, a first transparent nonmagnetic layer, a recording section, a second transparent nonmagnetic layer and a reflector layer. The recording section comprises a plurality of thin magneto-optic recording layers interspersed with separating thin transparent nonmagnetic layers. The multiple magneto-optic layers act to average out the transition jitters in the recorded disk. The result is a media with a greatly improved signal to noise ratio.

For a fuller understanding of the nature and advantages of the present invention reference should be made to the following detailed description taken in conjunction with the accompanying drawings.

DESCRIPTION OF THE PREFERRED EMBODIMENTS

Figure 1:
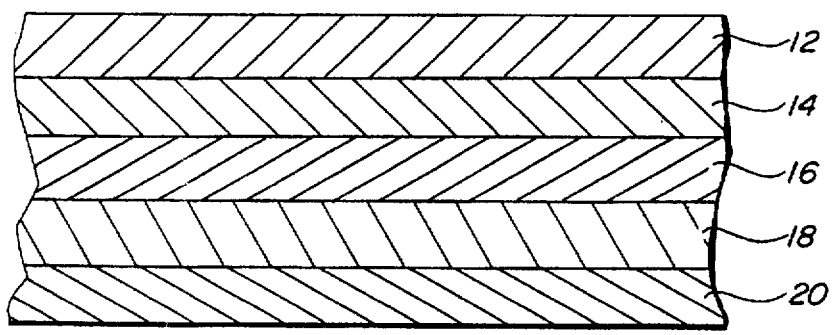
FIG. 1 is a schematic cross-sectional view of a magneto-optic recording media of the prior art.

FIG. 1 is a schematic cross-sectional view of a magneto-optic media of the prior art and is designated by the general reference number 10. Media 10 has a transparent substrate layer 12. A transparent dielectric layer 14 is located below the substrate 12. A single magneto-optic recording layer 16 is located below the dielectric layer 14. A second transparent dielectric layer 18 is located below the recording layer 16. A reflector layer 20 is located below the dielectric layer 18. Using media 10 a signal to noise ratio on the order of 63 to 64 dB may be obtained with 30 kilohertz band width.

Figure 2:
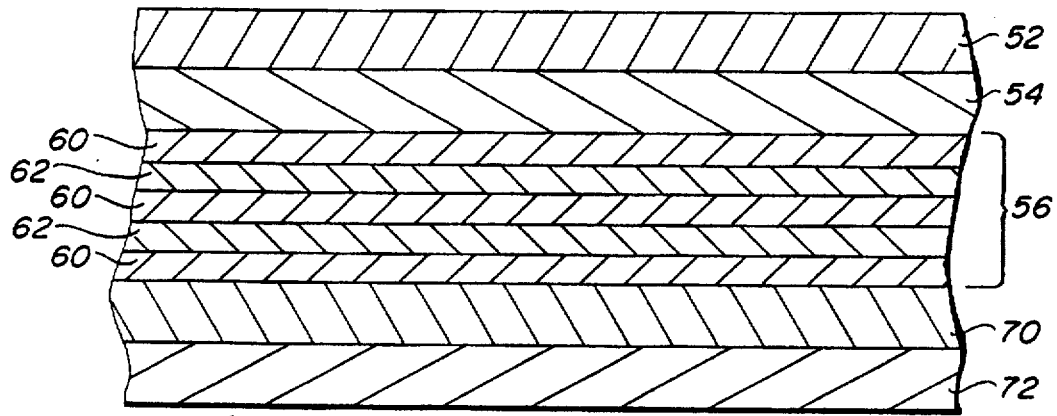
FIG. 2 is a schematic cross-sectional view of a first embodiment magneto-optic recording media of the present invention.

FIG. 2 is a schematic cross-sectional view of a recording media of the present invention and is designated by the general reference number 50. Media 50 has a transparent substrate 52. Substrate 52 may be glass or transparent plastics, such as polycarbonate and is approximately 1.2 mm in thickness. The substrate 52 has an index of refraction of approximately 1.5.

A transparent nonmagnetic layer 54 is located below substrate 52. Layer 54 is made of an optically transparent material with low light absorption. The index of refraction is approximately 1.7 or higher. A number of materials may be used in layer 54 including such dielectric materials as silicon nitride, aluminum nitride, zirconium oxide or terbium oxide. The thickness of layer 54 is determined by the index of refraction of the material used in layer 54 and the optical enhancement desired.

Recording section 56 is located below layer 54. Recording section 56 is comprised of a plurality of thin magneto-optic recording layers 60 interspersed with a plurality of thin separating transparent nonmagnetic layers 62. If there are N number of recording layers 60, then there will be (N−1) number of separating layers 62 interspersed between them.

Magneto-optic recording layers 60 may be made of rare earth and transition metal alloys such as terbium iron cobalt. The layers 62 may be made of the same type of material as layer 54. The sum of the thicknesses of all recording layers 60 in section 56 is approximately 150 to 400 Angstroms thick and this sum is about the same thickness as the single recording layer 16 of the prior art.

A transparent nonmagnetic layer 70 is located below section 56. Layer 70 may be made of the same type of material as layer 54. A reflector 72 is located below layer 70. Reflector 72 may be made of aluminum or copper. The thickness of layer 70 may be chosen according to the desired optical enhancement.

Media 50 is manufactured by a sputtering process. Each layer is deposited in succession on the substrate in a separate sputtering process.

Figure 3:
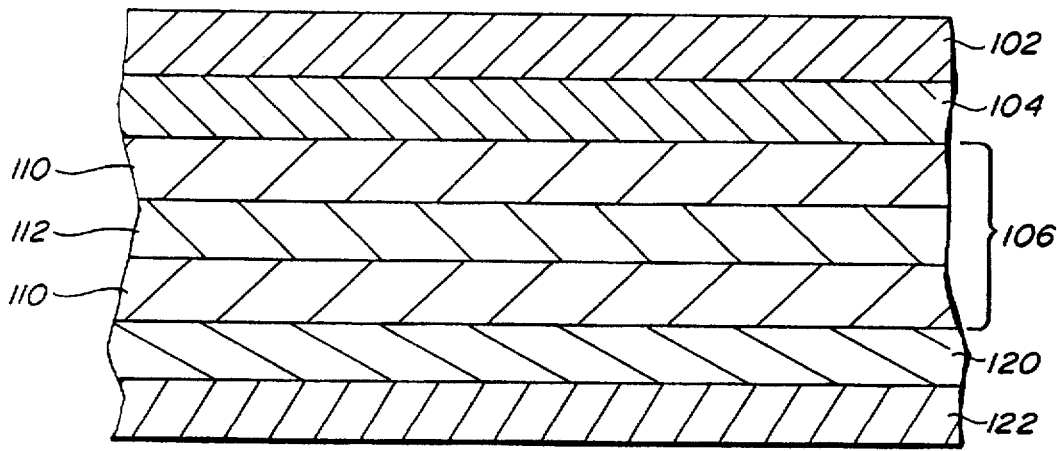
FIG. 3 is a schematic cross-sectional view of a second embodiment of a magneto-optic recording media of the present invention.

FIG. 3 shows a schematic cross-sectional view of an embodiment of the recording media of the present invention and is designated by the general reference number 100. Media 100 has a substrate 102 of 1.2 mm thickness and made of glass. A first transparent nonmagnetic layer 104 is located below substrate 102. Layer 104 is made of silicon nitride and is approximately 800 Angstroms thick.

A recording section 106 is located below layer 104. Section 106 is comprised of a pair of magneto-optic layers 110 interspersed by a single transparent nonmagnetic layer 112. Layers 110 are both made of terbium iron cobalt and are each 100 Angstroms thick. Layer 112 is made of silicon nitride and is 100 Angstroms thick.

A transparent nonmagnetic layer 120 is located below section 106. Layer 120 is made of silicon nitride and is 200 Angstroms thick. A reflector layer 122 is located below layer 120 and is made of aluminum. Media 100 is manufactured in a sputtering process similar to that used for media 50.

Figure 4:
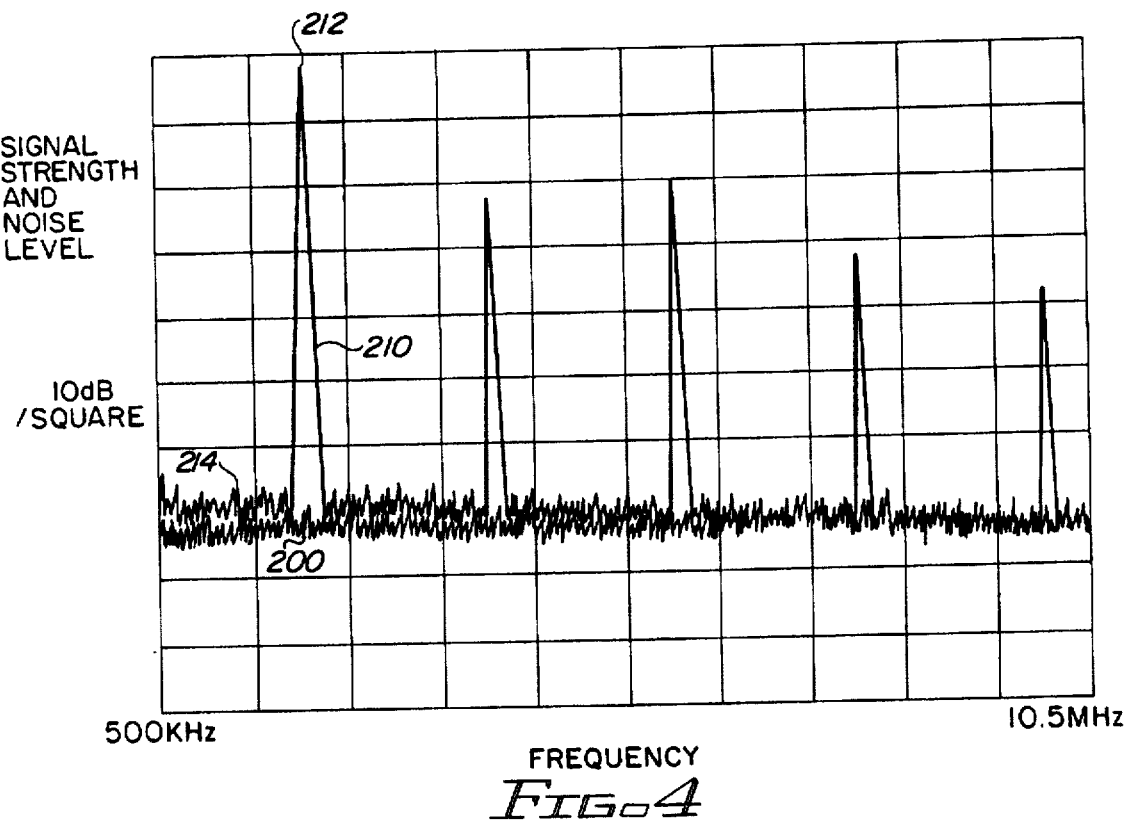
FIG. 4 is a graph of signal strength and noise level versus frequency for the media of FIG. 3.

FIG. 4 shows a graph of signal strength and noise versus frequency for reading the media 100 of FIG. 3. A line 200 represents the noise level of the disk prior to writing. A line 210 represents the signal received when reading the disk. A peak signal 212 represents the recorded data, while the lower levels 214 of line 210 represent the background noise encountered during reading. It can be seen that a carrier signal to noise ratio (point 212 vs. level 214) of approximately 67 dB is obtained. This compares with at most a 64 dB signal to noise ratio of the prior art.

Figure 5:
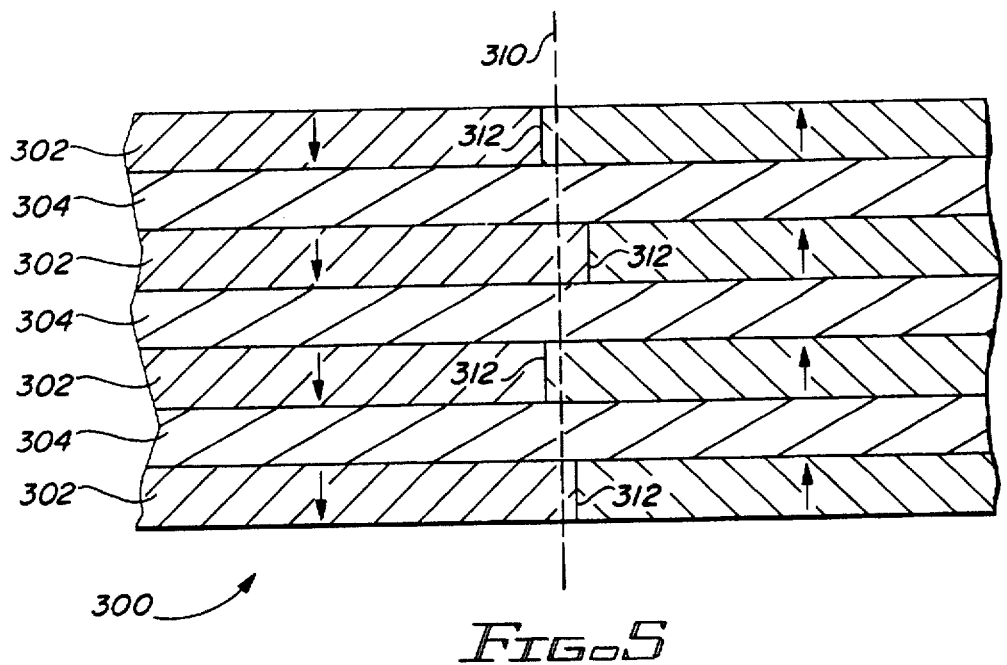
FIG. 5 is a schematic cross-sectional view of the recording section of the present invention showing uncorrelated transitions in the magneto-optic layers.

FIG. 5 shows a schematic cross-sectional view of a recording section 300 of the present invention. A plurality of magneto-optic recording layers 302 are interspersed by a plurality of transparent nonmagnetic layers 304. A line 310 represents the ideal position of the magnetic domain transition in section 300. A plurality of lines 312 represent the actual transition positions in section 300. Arrows in layers 302 represent the direction of the magnetic domain on either side of transitions 312. In this case the layers 302 on the left have a downward magnetic direction and the layers 302 on the right have an upward magnetic direction. The layers 304 are made thick enough so that there is no exchange interaction between the layers 302. This means that the written magnetic transitions in the recording layers 302 are almost independent of each other.

The read back transition jitter (i.e. the standard deviation of read back transitions from the ideal average transition) is reduced from that of a single layer by a factor of $\bar{N}$ simply by averaging the transition positions of N magneto-optic recording layers that can be reached by the read beam. The media transitions noise will be reduced by $20 \log \bar{N}$ (dB). For N equals 2 the expected reduction in jitter noise should be 3 dB. This agrees well with the actual results of FIG. 4 where N equals 2 and the improvement of the carrier signal to noise ratio was approximately 3 dB (from 64 dB to 67 dB).

The signal to noise ratio can be improved even further by adding more magneto-optic layers. The only limitation is that the total thickness of the magneto-optic layers must be small enough to allow the read beam to fully penetrate to the lowest magneto-optic layer. Generally, this means keeping the sum of the thicknesses in the recording layers in the recording section 56 at approximately the same thickness as the single recording layer 16 of the prior art.

The present invention thus achieves a significant improvement in signal to noise ratio. This improvement will allow the media to be used at a faster data transfer rate and/or increased recording density.

Although the preferred embodiment of the present invention has been shown using magneto-optic technology, it may also be used in other types recording media such as phase change optical recording. Phase change layers would simply be substituted for the magneto-optic layers.

While the invention has been shown and described with reference to preferred embodiments thereof, it would be understood by those skilled in the art the various changes in form and detail may be made without departing from the spirit and scope of the invention. Accordingly, the invention is not to be deemed limited except as specified in the claims.

What is claimed is:

1. A magneto-optical recording medium comprising:

a substrate;

a first dielectric layer overlying the substrate;

a multi-layered magneto-optical recording section overlying said first dielectric layer wherein said multi-layered magneto-optical recording section comprises a plurality of layers including at least two data recording layers of a magneto-optical recording material separated by a separating layer located between the two data recording layers, the separating layer consisting of a dielectric material which is selected from the group consisting of silicon nitride, aluminum nitride, zirconium oxide and terbium oxide;

a second dielectric layer overlying the multi-layered magneto-optical recording section; and a reflector layer overlying the second dielectric layer, wherein the separating layer of the dielectric material and each of the magneto-optical data recording layers have the same thickness.

2. A magneto-optical recording medium comprising:

a substrate;

a first dielectric layer overlying the substrate;

a multi-layered magneto-optical recording section overlying said first dielectric layer wherein said multi-layered magneto-optical recording section comprises a plurality of layers including at lest two data recording layers of a magneto-optical recording material separated by a separating layer located between the two data recording layers, the separating layer consisting of a dielectric material which is selected from the group consisting of silicon nitride, aluminum nitride, zirconium oxide and terbium oxide;

a second dielectric layer overlying the multi-layered magneto-optical recording section; and a reflector layer overlying the second dielectric layer, wherein the recording section comprises two 100 Å thick magneto-optical data recording layers and one 100 Å thick separating layer.

3. A magneto-optical recording medium comprising:

a substrate;

a first dielectric layer overlying the substrate;

a multi-layered magneto-optical recording section overlying said first dielectric layer wherein said magneto-optical recording section comprises a plurality of layers including at least two data recording layers of a magneto-optical recording material separated by a separating layer located between the two data recording layers, the separating layer consisting of a nonmetallic dielectric material having a thickness chosen to substantially isolate magnetic interaction between said two layers of magneto-optical recording material;

a second dielectric layer overlying the multi-layered magneto-optical recording section; and a reflector layer overlying the second dielectric layer, wherein the separating layer of the dielectric material and each of the magneto-optical data recording layers have the same thickness.

4. A magneto-optical recording medium comprising:

a substrate;

a first dielectric layer overlying the substrate;

a multi-layered magneto-optical recording section overlying said first dielectric layer wherein said magneto-optical recording section comprises a plurality of layers including at least two data recording layers of a magneto-optical recording material separated by a separating layer located between the two data recording layers, the separating layer consisting of a nonmetallic dielectric material having a thickness chosen to substantially isolate magnetic interaction between said two layers of magneto-optical recording material;

a second dielectric layer overlying the multi-layered magneto-optical recording section; and a reflector layer overlying the second dielectric layer, wherein the recording section comprises two 100 Å thick magneto-optical data recording layers and one 100 Å thick separating layer.

5. A magneto-optical recording medium comprising:

a light transparent substrate;

a first light transparent dielectric layer overlying the substrate;

a first magneto-optical data recording layer overlying the first dielectric layer;

a light transparent separating layer consisting of a nonmetallic dielectric material overlying the first data recording layer;

a second magneto-optical data recording layer overlying the separating layer, such that the separating layer lies between the first and second data recording layers;

a second light transparent dielectric layer overlying the second data recording layer; and a reflector overlying the second dielectric layer; and a reflector overlying the second dielectric layer, wherein the separating layer of the dielectric material and each of the magneto-optical data recording layers have the same thickness.

6. A magneto-optical recording medium comprising:

a light transparent substrate;

a first light transparent dielectric layer overlying the substrate;

a first magneto-optical data recording layer overlying the first dielectric layer;

a light transparent separating layer consisting of a nonmetallic dielectric material overlying the first data recording layer;

a second magneto-optical data recording layer overlying the separating layer, such that the separating layer lies between the first and second data recording layers;

a second light transparent dielectric layer overlying the second data recording layer; and a reflector overlying the second dielectric layer; and a reflector overlying the second dielectric layer, wherein the recording section comprises two 100 Å thick magneto-optical data recording layers and one 100 Å thick separating layer.

7. A magneto-optical recording media comprising:

a substrate;

a first dielectric layer overlying the substrate;

a multi-layered magneto-optical recording section overlying said first dielectric layer, wherein said multi-layered magneto-optical recording section comprises a plurality of layers of uniform thickness including at least two data recording layers of a magneto-optical recording material separated by a separating layer located between the recording layers, the plurality of layers having a thickness in the range of 50 to 133 Angstroms each and the separating layer being comprised of a dielectric material which is selected from the group consisting of silicon nitride, zirconium oxide and terbium oxide;

a second dielectric layer overlying the multi-layered magneto-optical recording section; and a reflector layer overlying the second dielectric layer.

8. The medium of claim 7, wherein the recording section comprises two 100 Å thick magneto-optical recording layers and one 100 Å thick separating layer.

9. A magneto-optical recording media comprising:

a substrate;

a first dielectric layer overlying the substrate;

a multi-layered magneto-optical recording section overlying said first dielectric layer wherein said multi-layered magneto-optical recording section comprises a plurality of layers of uniform thickness including at least two data recording layers of a magneto-optical recording material separated by a separating layer located between the recording layers, said plurality of layers having a thickness in the range of 50 to 133 Angstroms each;

a second dielectric layer overlying the multi-layered magneto-optical recording section; and a reflector layer overlying the second dielectric layer.

10. The medium of claim 9, wherein the recording section comprises two 100 Å thick magneto-optical recording layers and one 100 Å thick separating layer.

11. A magneto-optical recording medium comprising:

a light transmissive substrate;

a first magneto-optical data recording layer overlying the substrate;

a light transparent separating layer overlying the first data recording layer;

a second magneto-optical data recording layer overlying the separating layer, such that the separating layer lies between the first and second data recording layers;

a second light transparent dielectric layer overlying the second data recording layer; and a reflector layer overlying the second dielectric layer;

wherein the first magnetic-optical data recording layer, the light transparent separating layer, the second magnetic-optical data recording layer and the second light transparent dielectric layer have the same thickness, said thickness in the range from 50 to 133 angstroms each.

12. The medium of claim 11, wherein the recording medium comprises two 100 Å thick magneto-optical recording layers and two 100 Å thick separating layers.

* * * * *